(12) United States Patent
Day

(10) Patent No.: US 7,604,272 B2
(45) Date of Patent: Oct. 20, 2009

(54) CARGO COVER ASSEMBLIES FOR VEHICLES

(75) Inventor: Eric W. Day, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 30 days.

(21) Appl. No.: 11/969,497

(22) Filed: Jan. 4, 2008

(65) Prior Publication Data

US 2009/0174225 A1 Jul. 9, 2009

(51) Int. Cl.
*B60R 7/04* (2006.01)
(52) U.S. Cl. .............................. 296/37.16; 296/100.12
(58) Field of Classification Search ............. 296/37.16, 296/98, 100.12, 100.18; 160/280–282
See application file for complete search history.

(56) References Cited

U.S. PATENT DOCUMENTS

| | | | |
|---|---|---|---|
| 3,229,309 A | 1/1966 | Knodel | |
| 5,201,810 A * | 4/1993 | Ojima et al. | 160/265 |
| 5,597,028 A | 1/1997 | Rolf et al. | |
| 5,601,198 A | 2/1997 | Reed | |
| 5,839,237 A | 11/1998 | Davidson | |
| 6,488,325 B1 * | 12/2002 | Ehrenberger et al. | 296/37.16 |
| 2001/0020792 A1 | 9/2001 | Huotari | |
| 2002/0096902 A1 | 7/2002 | Oswald et al. | |

* cited by examiner

*Primary Examiner*—Dennis H Pedder
(74) *Attorney, Agent, or Firm*—Dinsmore & Shohl LLP

(57) ABSTRACT

A cargo cover assembly for covering a cargo area of a vehicle including: a housing; a panel portion secured to the housing, wherein the panel portion is configured to roll and unroll within the housing, a flexible rod associated with the panel portion and moveable with respect to the housing, and wherein when the cargo cover assembly is in an unretracted position, the panel portion is unrolled from the housing and the flexible rod flexes outwardly to substantially match a posterior portion of the cargo area so that the cargo cover assembly substantially conceals the cargo area.

18 Claims, 4 Drawing Sheets

CARGO COVER ASSEMBLIES FOR VEHICLES

TECHNICAL FIELD

The present invention generally relates to cargo cover assemblies for covering the cargo area of vehicles.

BACKGROUND

Sport utility or crossover vehicles have become very popular over the past several years. Some of these vehicles include an aggressive outer shape, including an arcuately shaped rear end. The interior cargo area of such vehicles similarly conforms to the general arcuate shape of the rear end. Cargo covers are typically utilized in such vehicles (e.g., those that do not have a fully enclosed trunk). Cargo covers conceal items that may be placed within the cargo area for storage and transportation purposes. However, because of the general contour of the cargo areas, it is difficult to conceal these areas from view with conventional cargo covers.

Conventional cargo covers only cover a rectangular area because the rigid frame of the retractable cargo cover limits the coverage area. In the case of today's aggressively and extremely styled vehicles, interior back door styling, which may consist of pronounced curvatures, further prevents full cargo area coverage with conventional cargo covers. Particularly, if the posterior of the cargo area of a vehicle has a pronounced curve, a conventional retractable cargo cover, which consists of a rigid rod and a plastic material, will not cover the curved portion of the cargo area. This uncovered portion exposes items that may be located in the curved portion of the cargo area.

Accordingly, cargo cover assemblies that substantially conceal cargo areas of vehicles, including curved portions, are desired.

SUMMARY

According to one embodiment, a cargo cover assembly for covering a cargo area may comprise a housing, a panel portion secured to the housing, wherein the panel portion is configured to roll and unroll within the housing and a flexible rod associated with the panel portion and moveable with respect to the housing. When the cargo cover assembly is in an unretracted position, the panel portion may be unrolled from the housing and the flexible rod may flex outwardly to substantially match a posterior portion of the cargo area so that the cargo cover assembly substantially conceals the cargo area.

According to another embodiment, a cargo cover assembly for covering a cargo area may comprise a housing comprising a panel portion, wherein the panel portion is received within the housing, a frame member associated with the panel portion, the frame member comprising a first end having a first spring and a second end having a second spring and a flexible rod comprising a first hooked end and a second hooked end, wherein the first end of the frame member is configured to receive the first hooked end of flexible rod and the second end of frame member is configured to receive the second hooked end of flexible rod. When the panel portion pulled in a direction away from the housing, the first and second hooked ends compress against the first and second springs so that the flexible rod flexes outwardly.

According to yet another embodiment, a vehicle may comprise a cargo area having a first wall having a first locking slot and a second wall having a second locking slot, the first locking slot and the second locking slot configured to receive a cargo cover assembly, and the cargo cover assembly may comprise: a housing, a panel portion secured to the housing, wherein the panel portion is configured to roll and unroll within the housing, and a flexible rod associated with the panel portion and moveable with respect to the housing. When the cargo cover assembly is in an unretracted position, the panel portion may be unrolled from the housing and the flexible rod may flex outwardly to substantially match a posterior portion of the cargo area so that the cargo cover assembly substantially conceals the cargo area.

These and additional features can be more fully understood in view of the following detailed description, in conjunction with the drawings.

BRIEF DESCRIPTION OF THE DRAWINGS

The embodiments set forth in the drawings are illustrative and exemplary in nature and not intended to be limited of the inventions defined by the claims. Moreover, the individual features of the drawings will be more fully apparent and understood in view of the detailed description. The following detailed description of specific embodiments can be best understood when read in conjunction with the following drawings, where like structure is indicated with like reference numerals and in which:

DETAILED DESCRIPTION

Embodiments of the invention relate to cargo cover assemblies for concealing the cargo areas of aggressively or extremely styled vehicles (e.g., those having an arcuate or non-traditional cargo area). As will be discussed herein, the cargo cover assemblies generally comprise a housing with a retractable panel portion, a frame member and a cover portion, the cover portion having a flexible rod associated therewith. The flexible rod is capable of conforming to the shape of the rear or posterior portion of the cargo area to substantially conceal the cargo area of a vehicle such as those having such an aggressive or extreme style.

Figure 1:
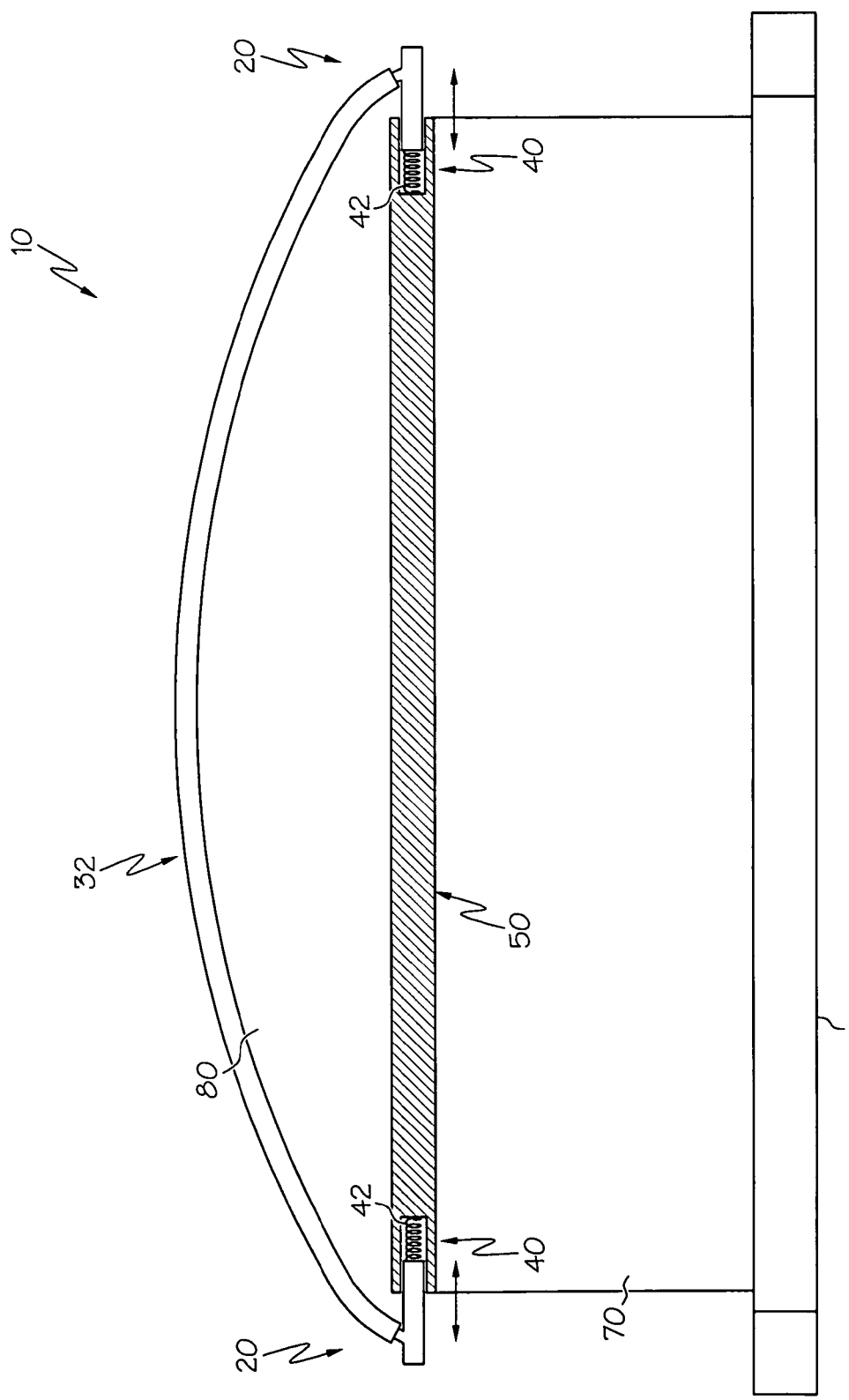
FIG. 1 is a top view of a cargo cover assembly in a partially unretracted position according to one or more embodiments of the present invention.

Referring to FIG. 1, one embodiment of a cargo cover assembly 10 is illustrated in a partially unretracted position. The cargo cover assembly may comprise a frame member 50 secured to a panel portion 70, the panel portion being retractable within housing 60. As illustrated, the frame member 50 may comprise a first and second end 40. The first and second ends 40 may be configured as rectangular slots or as other appropriate geometry to accept the ends 20 of the flexible rod 32. The frame member 50 may be made of any rigid material, including, but not limited to metal, fiberglass, plastic or composites thereof. The frame member should be of a length to extend across the cargo area.

The first and second ends 40 of the frame member are configured to have a compression assembly that such that the compression assembly is in an uncompressed state when the cargo cover assembly 10 is a retracted state and in a compressed state when in an unretracted state. FIG. 1 illustrates the compression assembly as springs 42 located within the first and second ends 40 of the frame member 50. According to other embodiments, pistons may be located within the first and second ends 40 of the frame member 50. In another embodiment, any components configured to allow flexible rod 32 to move relative to frame member 50 may be utilized.

The flexible rod 32 may be coupled to the frame member 50. The ends 20 of the flexible rod 32 may be positioned within the ends 40 of the frame member 50. As illustrated in FIG. 1, the ends 20 of the flexible rod 32 may comprise first and second hooked ends 20 that are accepted by the first and second ends 40 of the frame member 50. According to other embodiments, the flexible rod 32 and the ends 20 may be one unit. As such, the flexible rod 32 may be a flexible rod with integrated hooked ends. The flexible rod 32, which is illustrated of a length that is longer than frame member 50, may be made of any material that allows the flexible rod 32 to flex outwardly when compressed about the ends 20.

Located between the flexible rod 32 and the frame member 50 may be the cover portion 80 that covers the curved portion of the cargo area when the cargo cover assembly 10 is in an unretracted position. The cover portion 80 may be made of a flexible non-woven material that may be stretched when the cargo cover assembly 10 is in an unretracted position. The cover portion may comprise, for example Spandex®, nylon or other materials. The cover portion 80 may be attached to the flexible rod 32 by any appropriate method, including, for example, hooks and loops, snaps or a loop within the cover portion 80 in which the flexible rod 32 is threaded through or located in. Similarly, the cover portion 80 may be attached to the frame member 50 by any mechanically appropriate component. For example, the cover portion 80 may be clamped to the frame member 50, attached by staples, attached by hooks and loops or other fastening components.

Figure 2:
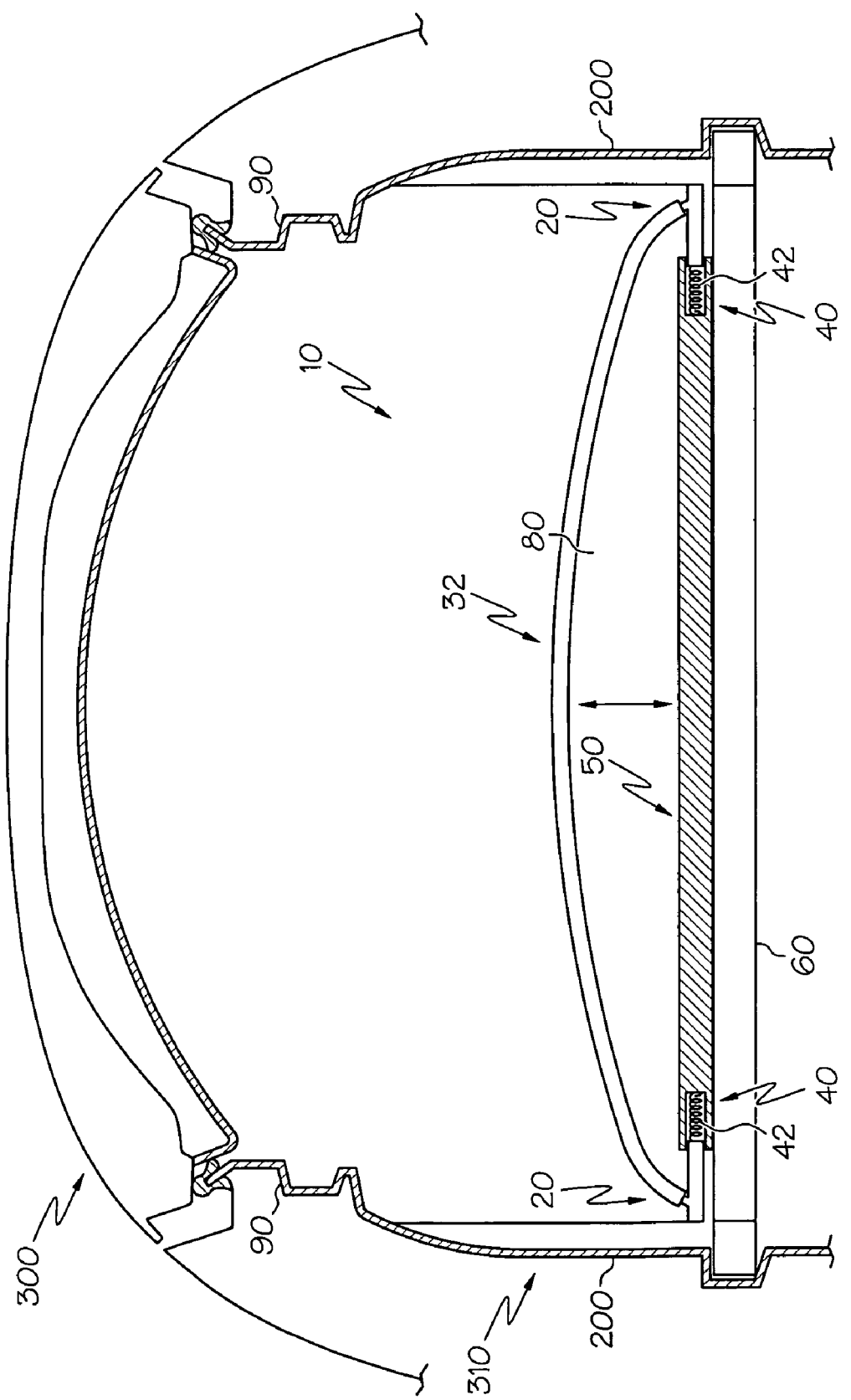
FIG. 2 is a top view of a cargo cover assembly in a retracted position according to one or more embodiments of the present invention.

Referring now to FIG. 2, a top view of an exemplary cargo cover assembly 10 in a retracted position within a vehicle is illustrated. As illustrated, the ends of the housing 60 are positioned into locking slots 220 within the first and second walls 200 of the vehicle. However, the housing 60 may also be secured to the vehicle by other methods. In the retracted position illustrated in FIG. 2, the frame member 50 of the exemplary embodiment rests concomitantly against the housing 60, allowing the cargo area of the vehicle to be uncovered. When the cargo cover assembly 10 is in a retracted position as illustrated in FIG. 2, the flexible rod 32 is not compressed and is in a relatively unflexed position. Additionally, the panel portion (not shown) is rolled within the housing 60 in this retracted position.

The housing 60 is configured to house at least panel portion 70 that is attached to the frame member 50. The housing 60 may be made of any appropriate rigid material including, but not limited to, plastic, metal, fiberglass or composites thereof. The housing 60 may be either removably or permanently attached to the rear seats of the vehicle according to some embodiments, or to a structure located behind the rear seats of the vehicle according to other embodiments. The panel portion 70 may provide rectangular coverage of the cargo area. The panel portion 70 may be configured to roll and unroll from within the housing 60 according to some embodiments. According to other embodiments, panel portion 70 may be configured to roll and unroll from within the frame member 50. Accordingly, the panel portion may be made of cloth, Nylon®, polyester or any other type of material that may be rolled and unrolled.

Figure 3:
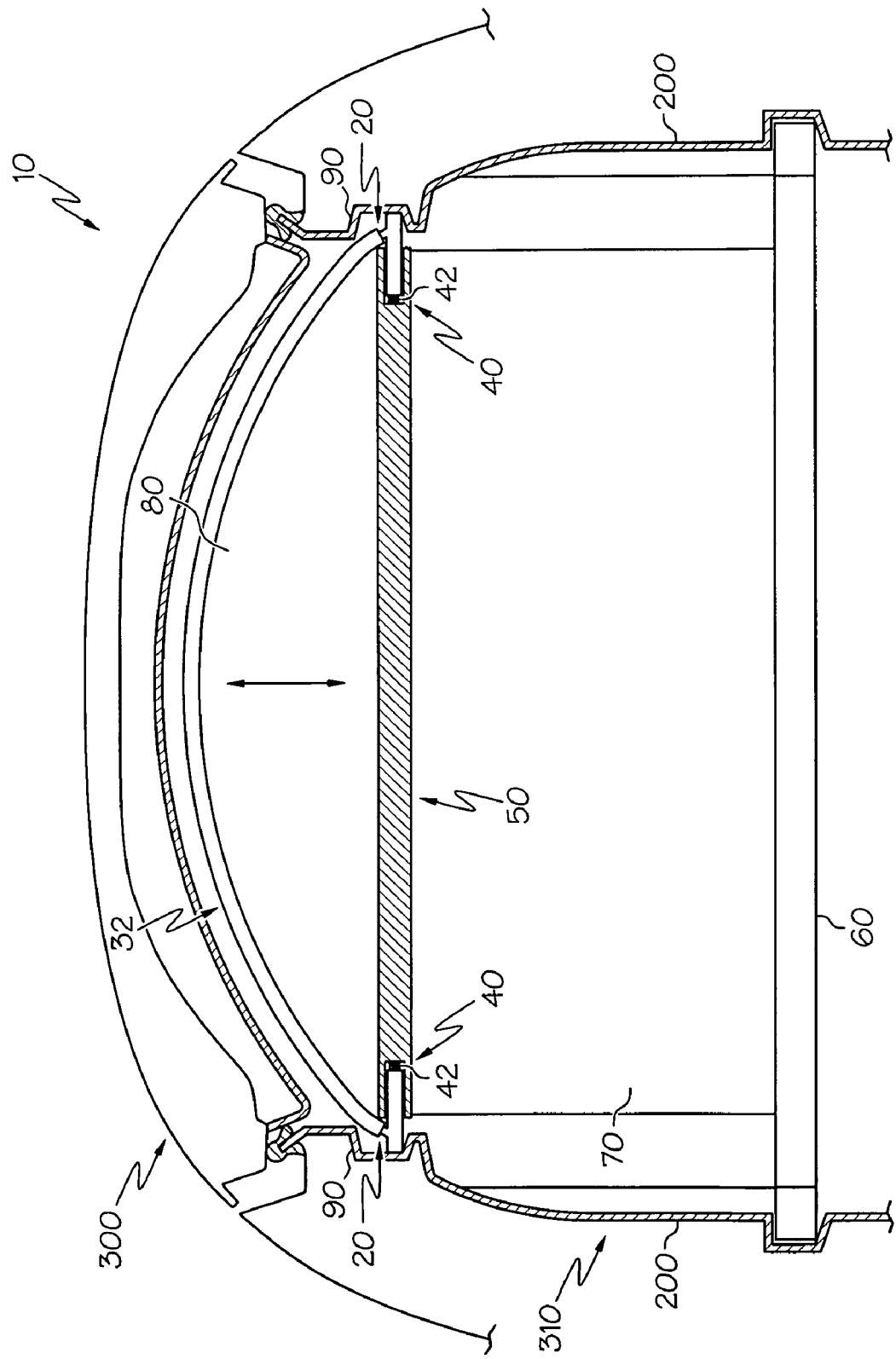
FIG. 3 is a top view of a cargo cover assembly in an unretracted position according to one or more embodiments of the present invention.

FIG. 3 illustrates a top view of an exemplary cargo cover assembly 10 in an unretracted position within a vehicle. When the cargo cover assembly 10 is in an unretracted position, the ends 20 of the flexible rod 32 move inwardly as the ends 20 move along the first and second walls 200 of the cargo area, thereby compressing the springs 42 within the first and second ends 40 of the frame member 50. This causes the flexible rod 32 to flex outwardly and thereby changes the shape of the cover portion 80. The flexing of flexible rod 32 allows the cargo cover assembly 10 to substantially match the posterior contour of the cargo area, including any curvatures that may be present. By matching the posterior contour of the cargo area of the vehicle, the cargo area is substantially concealed and the items located within are out of view.

Figure 4:
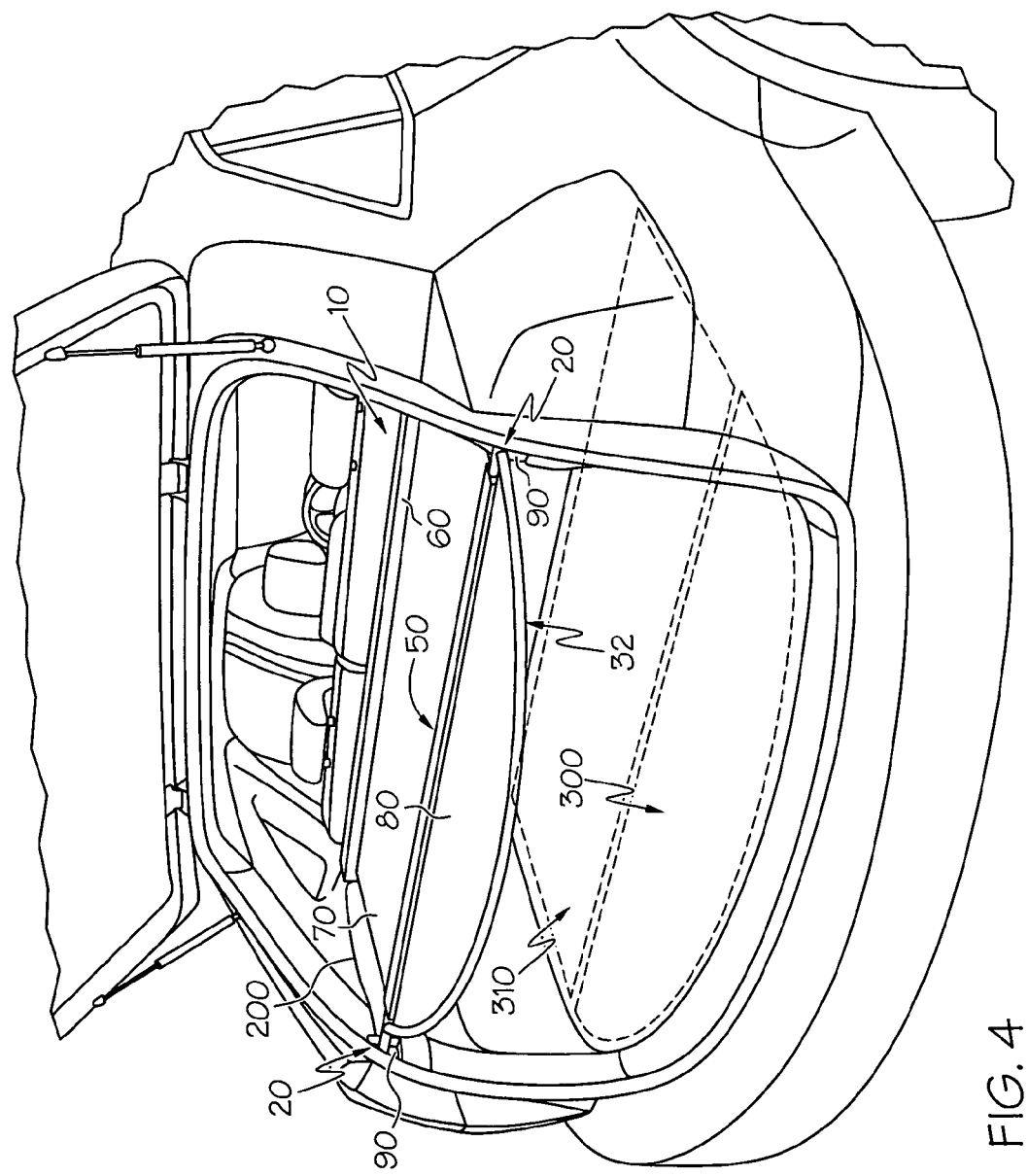
FIG. 4 is a perspective view of a vehicle comprising an exemplary cargo cover assembly in an unretracted position according to one or more embodiments of the present invention.

FIG. 4 illustrates an exemplary embodiment installed in a vehicle. The cargo cover assembly 10 as illustrated in FIG. 4 is in an unretracted position, thereby flexing the flexible rod 32 outwardly and allowing the cover portion 80 to substantially conceal the rear portion 300 of the cargo area. The vehicle may be any type of vehicle, including, but not limited to, a sport utility vehicle, a wagon, or a hatchback.

As illustrated throughout the drawings in use, as a user pulls cargo cover assembly 10 from a retracted position (e.g., FIG. 2) to an unretracted position (e.g., FIG. 3), frame member 50 moves from the housing 60 toward the rear or posterior portion of the cargo area 300. The panel portion 70 is unrolled from the housing illustrated in FIG. 4 to cover the front or anterior portion 310 of the cargo area, as well as the rear or posterior portion 300

The ends 20 of flexible rod 32 press against and slide along the first and second walls 200 of the cargo area of the vehicle. According to some embodiments, the ends 20 slide along a track located within the first and second walls 200. According to other embodiments, the ends press against and slide along the walls 200 of the cargo area of the vehicle without the use of tracks. According to yet other embodiments, the ends 20 of flexible rod 32 do not press against the first and second walls 200 of the cargo area of the vehicle until the ends 40 of the frame member 50 are placed into the first and second locking slots 90.

As illustrated in FIG. 4, the rear or posterior portion 300 of the cargo area may have a pronounced curve that is defined by the first and second walls 200 and rear door opening. The frame member 50 and the flexible rod 32 are pulled toward the posterior portion of the cargo area and the cargo cover assembly 10 is locked into place by placing the ends 40 of the frame member 50 into the locking slots 90. The locking slots 90 may be integrated indentations in the first and second walls 200 of the cargo area, or according to other embodiments, they may consist of other mechanical locking components.

The foregoing description of the various embodiments and principles of the inventions has been presented for the purpose of illustration and description. It is not intended to be exhaustive or to limit the invention to the precise forms disclosed. Many alternatives, modifications and variations will be apparent to those skilled in the art. Moreover, although many inventive aspects have been presented, such aspects need not be utilized in combination, and various combinations of inventive aspects are possible in light of the various embodiments provided above. Accordingly, the above description is intended to embrace all possible alternatives, modifications, combinations and variations that have been discussed or suggested herein, as well as others that fall within the principles, spirit, and broad scope of the various inventions as defined by the claims.

For the purposes of describing and defining the present invention it is noted that the term "substantially" or "relatively" is utilized herein to represent the inherent degree of uncertainty that may be attributed to any quantitative comparison, value, measurement, or other representation.

What is claimed is:

1. A cargo cover assembly for covering a cargo area of a vehicle comprising:
   a housing;
   a panel portion secured to the housing, wherein the panel portion is configured to roll and unroll within the housing;
   a flexible rod comprising a first hooked end and a second hooked end; and
   a frame member coupled to an end of the panel portion and moveable with respect to the housing, wherein the frame member comprises a first end configured to receive the first hooked end of the flexible rod and a second end configured to receive the second hooked end of the flexible rod;
   wherein when the cargo cover assembly is in an unretracted position, the panel portion is unrolled from the housing and the flexible rod flexes outwardly to substantially match a posterior portion of the cargo area so that the cargo cover assembly substantially conceals the cargo area.

2. The cargo cover assembly of claim 1 wherein the cargo cover assembly further comprises a cover portion attached to the flexible rod and the frame member.

3. The cargo cover assembly of claim 2 wherein the cover portion comprises a flexible non-woven material.

4. The cargo cover assembly of claim 2 wherein the flexible rod is of a length that is longer than the length of the frame member.

5. The cargo cover assembly of claim 2 wherein when the cargo cover is in a retracted position, the flexible rod is in a relatively unflexed position, the frame member is positioned concomitantly with the housing and the panel portion in a rolled position within the housing.

6. The cargo cover assembly of claim 2 wherein the first end of the frame member further comprises a first spring and the second end of the frame member further comprises a second spring.

7. The cargo cover assembly of claim 2 wherein when in an unretracted position the first and second ends of the frame member are positioned into a first locking slot and a second locking slot.

8. The cargo cover assembly of claim 7 wherein the first and second locking slots are configured as indentations within a first and second wall of the cargo area of the vehicle.

9. The cargo cover assembly of claim 1 wherein the cargo cover assembly is removably attached to the cargo area of the vehicle.

10. A cargo cover assembly for covering a cargo area of a vehicle comprising:
    a housing comprising a panel portion, wherein the panel portion is received within the housing;
    a frame member associated with the panel portion, the frame member comprising a first end having a first spring and a second end having a second spring;
    a flexible rod comprising a first hooked end and a second hooked end;
    wherein the first end of the frame member is configured to receive the first hooked end of flexible rod and the second end of frame member is configured to receive the second hooked end of flexible rod; and
    wherein compressing the first and second hooked ends inwardly against the first and second springs causes the flexible rod to flex outwardly.

11. The cargo cover assembly of claim 10 wherein the cargo cover assembly further comprises a cover portion comprising a flexible non-woven material attached to the flexible rod and the frame member.

12. The cargo cover assembly of claim 10 wherein when the cargo cover assembly is in an unretracted position, the panel portion is unrolled from the housing.

13. The cargo cover assembly of claim 10 wherein when in an unretracted position the first and second ends of the frame member are positioned into a first locking slot and a second locking slot.

14. The cargo cover assembly of claim 13 wherein the first and second locking slots are configured as indentations within a first and second wall of the cargo area of the vehicle.

15. A vehicle comprising:
    a cargo area comprising a first wall having a first locking slot and a second wall having a second locking slot; and
    a cargo cover assembly comprising:
      a housing;
      a panel portion secured to the housing, wherein the panel portion is configured to roll and unroll within the housing;
      a flexible rod comprising a first hooked end and a second hooked end; and
      a frame member associated with the panel portion, wherein the frame member comprises a first end configured to receive the first hooked end of the flexible rod and a second end configured to receive the second hooked end of the flexible rod;
    wherein when the cargo cover assembly is in an unretracted position, the panel portion is unrolled from the housing and the flexible rod flexes outwardly to substantially match a posterior portion of the cargo area so that the cargo cover assembly substantially conceals the cargo area.

16. The vehicle of claim 15 wherein the cargo cover assembly further comprises a cover portion comprising a flexible non-woven material attached to the flexible rod and the frame member.

17. The cargo cover assembly of claim 16 wherein when the cargo cover is in a retracted position, the flexible rod is in a relatively unflexed position, the frame member is positioned concomitantly with the housing and the panel portion in a rolled position within the housing.

18. The cargo cover assembly of claim 16 wherein when in an unretracted position the first and second ends of the frame member are positioned into the first locking slot and the second locking slot.

* * * * *